May 2, 1933.   R. MATSON   1,907,210
TRIPOD BRACE
Filed July 6, 1932
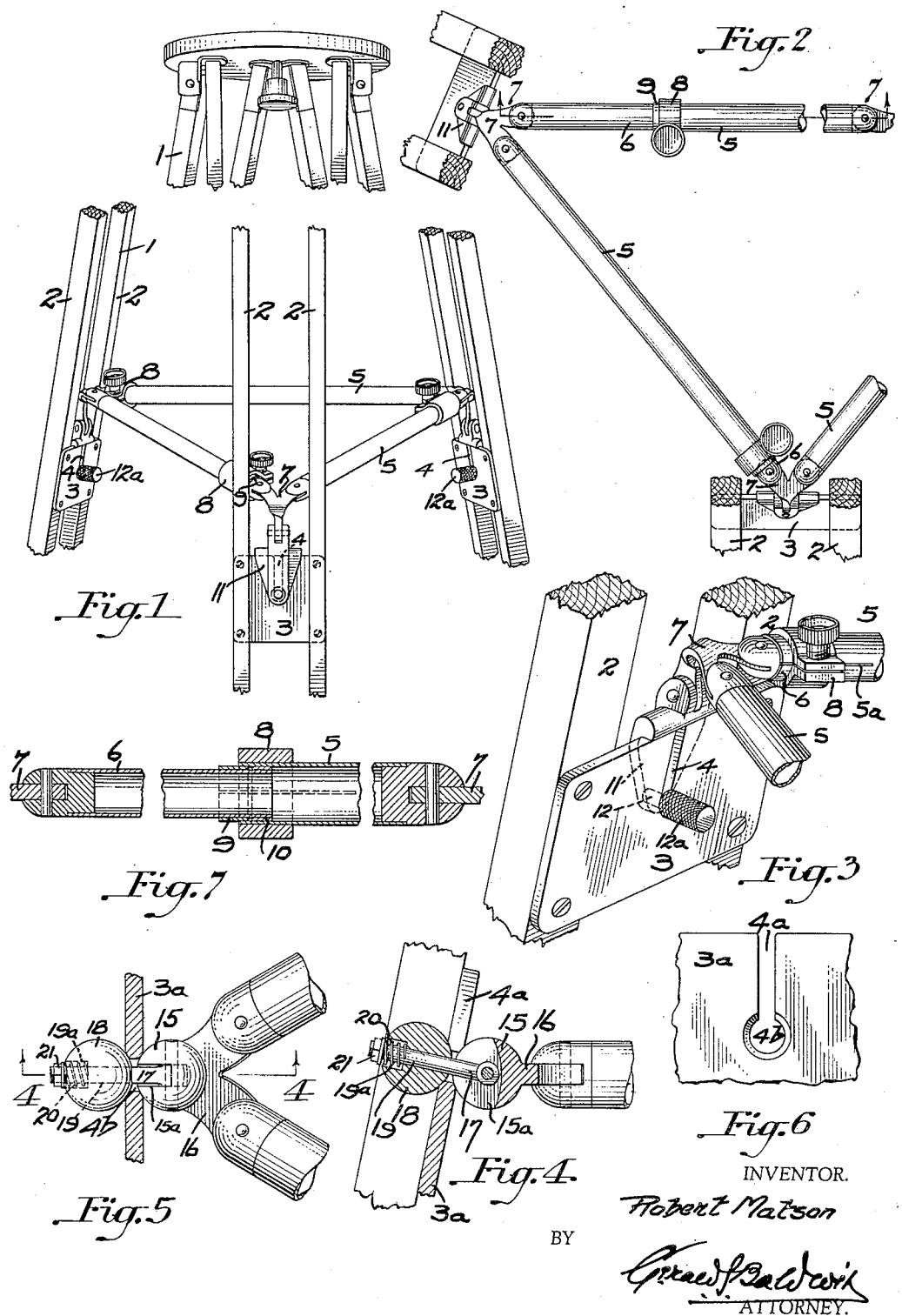
INVENTOR.
Robert Matson
BY
ATTORNEY.

Patented May 2, 1933

1,907,210

UNITED STATES PATENT OFFICE

ROBERT MATSON, OF DETROIT, MICHIGAN

TRIPOD BRACE

Application filed July 6, 1932. Serial No. 621,072.

This invention relates to improvements in tripod braces, and refers more particularly to braces for tripods used as stands for photographic and surveying equipment and the like.

It is an object of the invention to provide a tripod brace which is relative cheap to manufacture, and which may be readily mounted on a tripod so as to eliminate the possibility of the tripod being knocked down by one of the legs moving relative to the others when it is accidentally contacted.

Another object of the invention is to provide a tripod brace which can be readily adjusted to suit different spacings between the legs so that when the device has been installed the legs may be rigidly held relative to one another, or variously spaced.

A further object of the invention is to provide a tripod brace so constructed that the inclination of any one of the tripod legs may be readily varied and then held relatively to the others.

With these and other objects and advantages in view which will become apparent as the specification proceeds, the invention is hereinafter more fully described with the aid of the accompanying drawing, in which:

Figure 1 illustrates a perspective view of a portion of a conventional tripod with my brace arranged thereon.

Figure 2 is a partial plan view of the brace, somewhat enlarged.

Figure 3 is a further enlarged detail showing how the brace is connected to a tripod leg.

Figures 4 and 5 are enlarged details showing a modification of the brace construction.

Figure 6 is an enlarged detail of the modified plate construction employed on the tripod legs when the construction shown in Figures 4 and 5 is utilized.

Figure 7 is an enlarged section on the line 7—7 of Figure 2.

Referring to the drawing, 1 designates a conventional tripod having legs 2 each consisting in the present instance of two spaced members. Extending transversely between each pair of the latter and preferably resting against their inner faces plates 3 are secured which are vertically slotted from their upper margins.

The brace itself consists of three larger tubular members 5 each of which is closed at one extremity and has a connector 7 pivotally mounted about a vertical axis on that extremity. Slidable in the larger tubular members 5 are smaller tubular members 6 which extend outwardly from the open ends of the former. The outer extremities of the smaller members 6 are also closed and are pivotally mounted about a vertical axis on said connector. Thus each connector 7 is pivotally mounted on one larger member 5 and on one smaller member 6.

In order to prevent accidental movement of the members 6 in the members 5 the latter are longitudinally slotted at 5a adjacent their open ends, and around the latter clamps 8 are arranged. To prevent complete disengagement of the smaller members 6 from the larger ones 5, collars 9 are welded or otherwise suitably secured in the open ends of the latter, and the inner ends of the said collars are contacted by similar collars 10 secured around the inner ends of the smaller members 6 when the latter have been moved to their outward positions.

The outer extremities of the connectors 7, which are preferably downturned, have depending elements 11 pivoted thereon. In threaded engagement with the latter are locking screws 12 the threaded portions of which are materially smaller than their heads 12a. The screws 12 extend through the slots 4 of the plates 3 so that the elements 11 are on one side of the said plates and the screw heads 12a on the other. Thus when the screws are tightened the plates 3 are frictionally engaged.

From the foregoing it will be readily seen that the spacing between any two legs may be quickly varied by loosening one of the clamps 8 and adjusting the projection of the smaller member 6 held thereby; and, since each depending element 11 is pivotally mounted on its connector 7, the said elements automatically regulate themselves to suit the inclination of the leg adjacent which they lie.

In the modified construction shown in Figures 4, 5 and 6 a substantially spherical extremity 15 is formed integral with the connector 16 and extends outwardly therefrom. The spherical extremity 15 is radially slotted at 15a to receive a pin 17 which is pivotally mounted about the horizontal axis of the said spherical extremity and projects outwardly therefrom. The pin 17 extends through an aperture 19 formed through a sphere 18, and the said aperture is of enlarged diameter at 19a on the side of the sphere 18 remote from the connecting member 16. In the enlarged aperture portion 19a a helical spring 20 is provided around the pin 17, and the said spring extends from the inner end of the enlarged aperture portion 19a to a nut 21 provided on the outer extremity of the said pin. This spring tends to hold the adjacent portions of the sphere 18 and the spherical extremity 15 of the connecting member 7a in contact with one another. In this case the plate 3a (shown in Figure 6) as well as being provided with a vertical slot 4a has a circular enlargement 4b formed at the base of the said slot. Moreover the margins of this circular opening 4b are countersunk on both sides of the plate to form seats for portions of the sphere 18 and the spherical extremity 15.

In the modified construction it will be noted that due to the curvature of the sphere 18 and spherical extremity 15 the plate 3a is engaged satisfactorily at all angular inclinations of the legs 2 and eliminates the necessity for utilizing the pivoted depending element 11.

While in the foregoing the preferred embodiments of the invention have been described and shown, it is understood that the construction is susceptible to such further alterations and modifications as fall within the scope of the appended claims.

What I claim is:

1. A brace of the character described comprising a plurality of larger members having smaller members longitudinally slidable relative thereto, and connectors each mounted on one extremity of two of said members, in combination with plates each adapted to be secured to one leg of a stand wherein the inclination of each leg may be varied, and pivoted engaging means on said connectors each engaging one of said plates and permitting angular adjustment of the leg to which said plate is attached.

2. A brace of the character described comprising a plurality of larger members having smaller members longitudinally slidable relative thereto, and connectors each mounted on one extremity of one larger member and on one extremity of one smaller member, in combination with slotted plates each adapted to be secured to one leg of a stand wherein the inclination of each leg may be varied, and pivoted engaging means for said plates supported by said connectors, each of said means extending through one slotted plate.

3. An arrangement of the character described comprising a tripod, and a plate secured to each leg thereof, in combination with a brace consisting of a plurality of larger members having smaller members longitudinally slidable relative thereto, connectors each pivotally mounted on one extremity of one larger member and on one extremity of one smaller member, pivoted elements on said connectors, and means on said elements for engaging said plates irrespective of the inclination of said legs and holding the latter in varied spaced relation.

4. An arrangement of the character described comprising a tripod and a plate secured to each leg of the latter, in combination with a brace consisting of a plurality of larger members having smaller members slidable longitudinally relative thereto, means for holding each smaller member against accidental movement when it projects varying distances from its larger member, connectors each mounted on the extremities of two of said members, pivoted elements on said connectors, and means on said elements for engaging said plates irrespective of the inclination of said legs.

5. An arrangement of the character described comprising a tripod having a plate secured to each leg thereof, in combination with a brace consisting of a plurality of larger members having smaller member slidable relative thereto, means on said larger members cooperating with other means on said smaller members for preventing complete disengagement of the latter from the former, connectors each mounted on two of said members, pivoted elements on said connectors, and means on said elements for engaging said plates irrespective of the inclination of said legs.

6. An arrangement of the character described comprising a tripod having a plate secured to each leg thereof, in combination with a brace consisting of a plurality of larger tubes having smaller members slidable therein, means for holding each smaller tube when it projects varying distances from its larger tube, means on said larger tubes cooperating with means on said smaller members for preventing complete disengagement of the latter from the former, connecting members each pivotally mounted on one extremity of one larger tube and on one extremity of one smaller member, pivoted elements on said connecting members, and means on said elements for engaging said plates irrespective of the inclination of the legs for holding the latter in varying spaced relationship.

ROBERT MATSON.